(12) United States Patent
McMonigal

(10) Patent No.: US 7,597,005 B2
(45) Date of Patent: Oct. 6, 2009

(54) PRESSURE SENSOR HOUSING AND CONFIGURATION

(75) Inventor: Steven M. McMonigal, Maple Grove, MN (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 11/557,661

(22) Filed: Nov. 8, 2006

(65) Prior Publication Data

US 2007/0113668 A1 May 24, 2007

Related U.S. Application Data

(60) Provisional application No. 60/735,976, filed on Nov. 10, 2005.

(51) Int. Cl.
*G01L 7/00* (2006.01)
(52) U.S. Cl. ........................................ 73/756
(58) Field of Classification Search ............ 73/721, 73/727, 726, 720; 437/901; 257/417
See application file for complete search history.

(56) References Cited

U.S. PATENT DOCUMENTS

| 3,123,788 | A | | 3/1964 | Pfann et al. |
| 4,321,832 | A | | 3/1982 | Runyan |
| 4,683,755 | A | * | 8/1987 | Samek ........................ 73/727 |
| 4,739,381 | A | | 4/1988 | Hideo et al. |
| 5,459,351 | A | * | 10/1995 | Bender ....................... 257/417 |
| 7,278,319 | B2 | * | 10/2007 | Johnson ...................... 73/721 |
| 2003/0167851 | A1 | | 9/2003 | Parker |

FOREIGN PATENT DOCUMENTS

| WO | WO9429685 | 12/1994 |
| WO | WO2005103639 | 11/2005 |

* cited by examiner

*Primary Examiner*—Jewel Thompson
(74) *Attorney, Agent, or Firm*—Fogg & Powers LLC

(57) ABSTRACT

A pressure sensor housing and configuration is provided for a single-square-sensor (SSS) sensing die. A sensor includes a glass wafer hermetically bonded to the SSS chip. The SSS chip is then positioned between a header and a cover, which can be glued together using an epoxy, for example. A tube, such as a pyrex tube, is connected to the SSS chip through which pressure is sensed. After bonding the wafer to the SSS chip, a vacuum seal is created and thus less emphasis is placed on hermetically sealing the remainder of the sensor.

20 Claims, 7 Drawing Sheets

Figure 1 - Prior Art

PRESSURE SENSOR HOUSING AND CONFIGURATION

CROSS-REFERENCE TO RELATED APPLICATIONS

The present patent application claims priority under 35 U.S.C. § 119(e) to U.S. Provisional Patent Application Ser. No. 60/735,976, filed on Nov. 10, 2005, the entire contents of which are incorporated herein by reference as if fully set forth in this description.

FIELD OF INVENTION

The present invention relates generally to pressure sensors and, more particularly, to a pressure sensor housing and configuration for a unique sensing die.

BACKGROUND

A pressure sensor is typically either a gage, differential or absolute pressure sensor. With gage sensors, pressure readings are referenced to atmospheric pressure. That is, zero output is at atmospheric pressure. A differential pressure sensor is similar to a gauge pressure sensor, but instead of measuring pressure relative to ambient atmospheric pressure, differential measurements are taken with respect to a specific reference pressure. Absolute pressure sensors sense a pressure compared to near zero pressure or a vacuum reference. That is, an output of the pressure sensor is zero at full vacuum pressure. An absolute pressure reference is commonly used in applications such as calibration, altitude simulation, and a variety of low absolute pressure regulation situations, for example.

Many pressure sensor products have a stable reference pressure that is obtained through expensive custom packages and package sealing techniques. For example, a vacuum reference for an absolute pressure sensor can be created with custom hermetic packages. FIG. 1 illustrates a typical pressure sensor 100 that includes two Wheatstone bridges with sixteen resistors on a sensing die 102. A sensing side of the die is ionically bonded to a tube 104 through which pressure is measured. The die 102 and tube 104 are then soldered into a stainless steal header 106. The sensing die 102 is wire-bonded 108 to gold plated pins 110, so that an output of the sensing die 102 can be received from the pressure sensor 100. The gold plated pins 110 are hermetically sealed within the steal header 106 with a glass seal 112. The non-sensing side of the sensing die 102 is sealed by a weld cover 114 within a vacuum. Getter 116 is placed within the weld cover to absorb helium and other gases during soldering.

The pressure sensor 100 includes hermetically sealed pins 110 and a vacuum sealed cover 114. The seals provide the reference pressure, for example, a vacuum reference, for the pressure sensor 100. Thus, a pressure measurement from the sensing die should not be affected by ambient pressure. If the pressure sensor 100 was alternatively configured as a gauge or differential pressure sensor, hermetic and vacuum seals may still be required.

Within the packaging process of pressure sensors, such as the pressure sensor 100, sealing output pins and the sensing die from ambient pressures can be the most difficult and/or time-consuming step. Thus, it would be desirable to provide a vacuum reference on the sensing die to reduce the reliance on the hermetic package and package sealing techniques to achieve the absolute pressure sensor performance.

SUMMARY

In an exemplary embodiment, a sensor is provided that includes a single sensing die and a wafer cover. The single sensing die has a tangential resistance when current flow is tangential to the sensing die and a radial resistance when current flow is radial to the sensing die. The wafer cover has a recessed portion, and is bonded to a surface of the single sensing die to provide a vacuum seal within the recessed portion between the wafer cover and the single sensing die. The wafer cover is hermetically bonded to the single sensing die to provide the vacuum seal.

In another embodiment, a pressure and temperature sensor is provided that includes a header coupled to a cover, and a sensing die positioned in an area between the header and cover. A wafer cover that has a recessed portion is hermetically bonded to the sensing die to provide a vacuum seal as a reference pressure within the recessed portion. In this manner, the header and cover does not need to be hermetically sealed to provide a vacuum reference for the sensing die.

In yet another embodiment, a sensor is provided that includes a single square sensing die that has a tangential resistance when current flow is tangential to the sensing die and a radial resistance when current flow is radial to the sensing die, and by changing a direction of current through the single square sensing die a tangential voltage across the tangential resistance and a radial voltage across the radial resistance can be measured to determine a magnitude of a pressure applied to the single square sensing die and to determine a magnitude of an ambient temperature of the single square sensing die. A sensor cover is hermetically bonded to the single square sensing die so as to provide a vacuum reference for the sensing die. Further, a header coupled to a cover form a housing within which the single square sensing die is positioned.

These as well as other features and advantages will become apparent to those of ordinary skill in the art by reading the following detailed description, with appropriate reference to the accompanying drawings.

DETAILED DESCRIPTION

The present patent application may be related in part to the following patent applications, which are both herein entirely incorporated by reference, as if fully set forth in this description.

U.S. patent application Ser. No. 11/271,701 to Russell Johnson, entitled "Pressure and Temperature Sensing Element."

U.S. patent application Ser. No. 11/272,306 to Thomas Stratton, entitled "Method and System of Providing Power to a Pressure and Temperature Sensing Element."

In an exemplary embodiment, the present application describes a pressure sensor housing and configuration for a single-square-sensor (SSS) sensing die, as described in U.S. patent application Ser. No. 11/271,701 to Russell Johnson, entitled "Pressure and Temperature Sensing Element." Using the SSS die structure, a simple design can be implemented for a housing structure that meets manufacturing and consumer preferences.

I. SINGLE SQUARE SENSOR (SSS)

Figure 1:
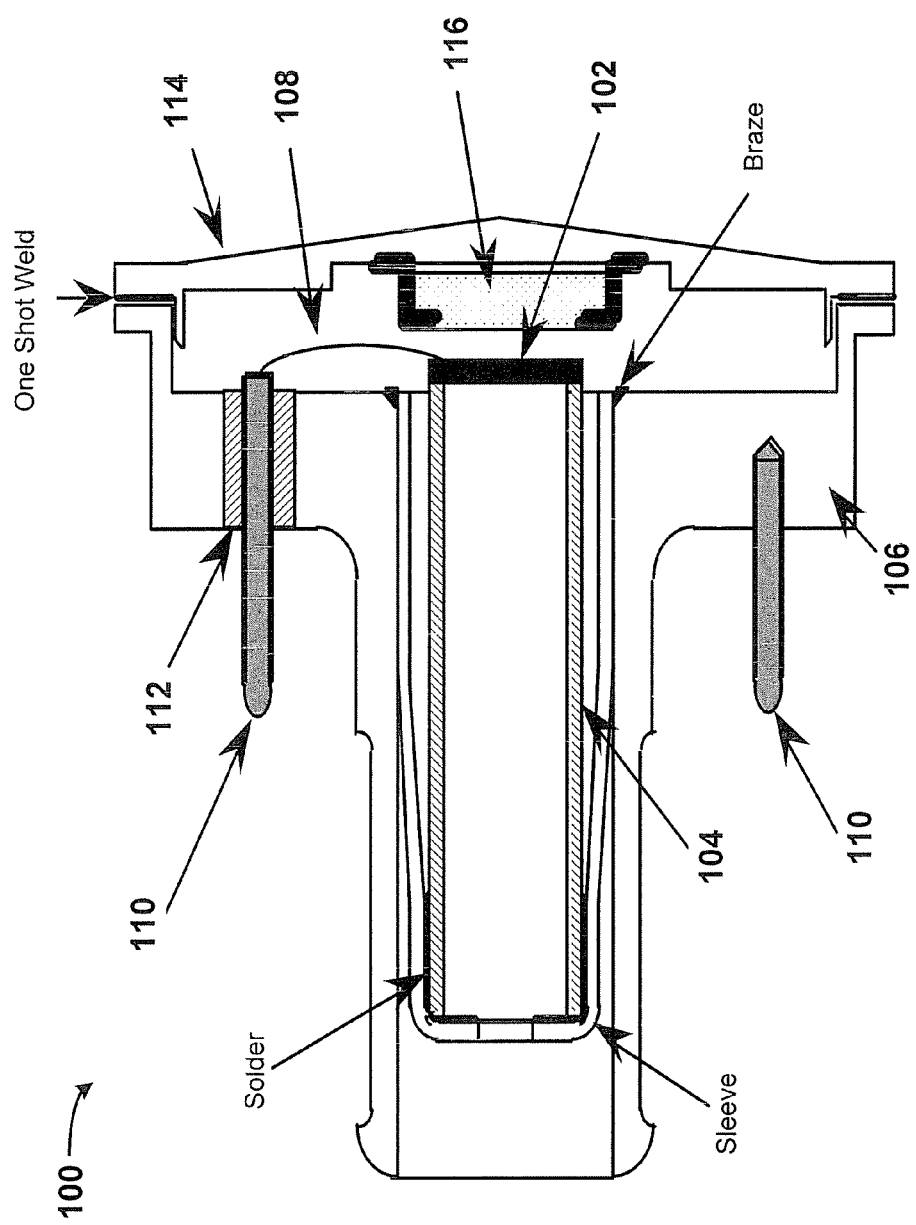
FIG. 1 illustrates one embodiment of a pressure sensor.
Figure 2:
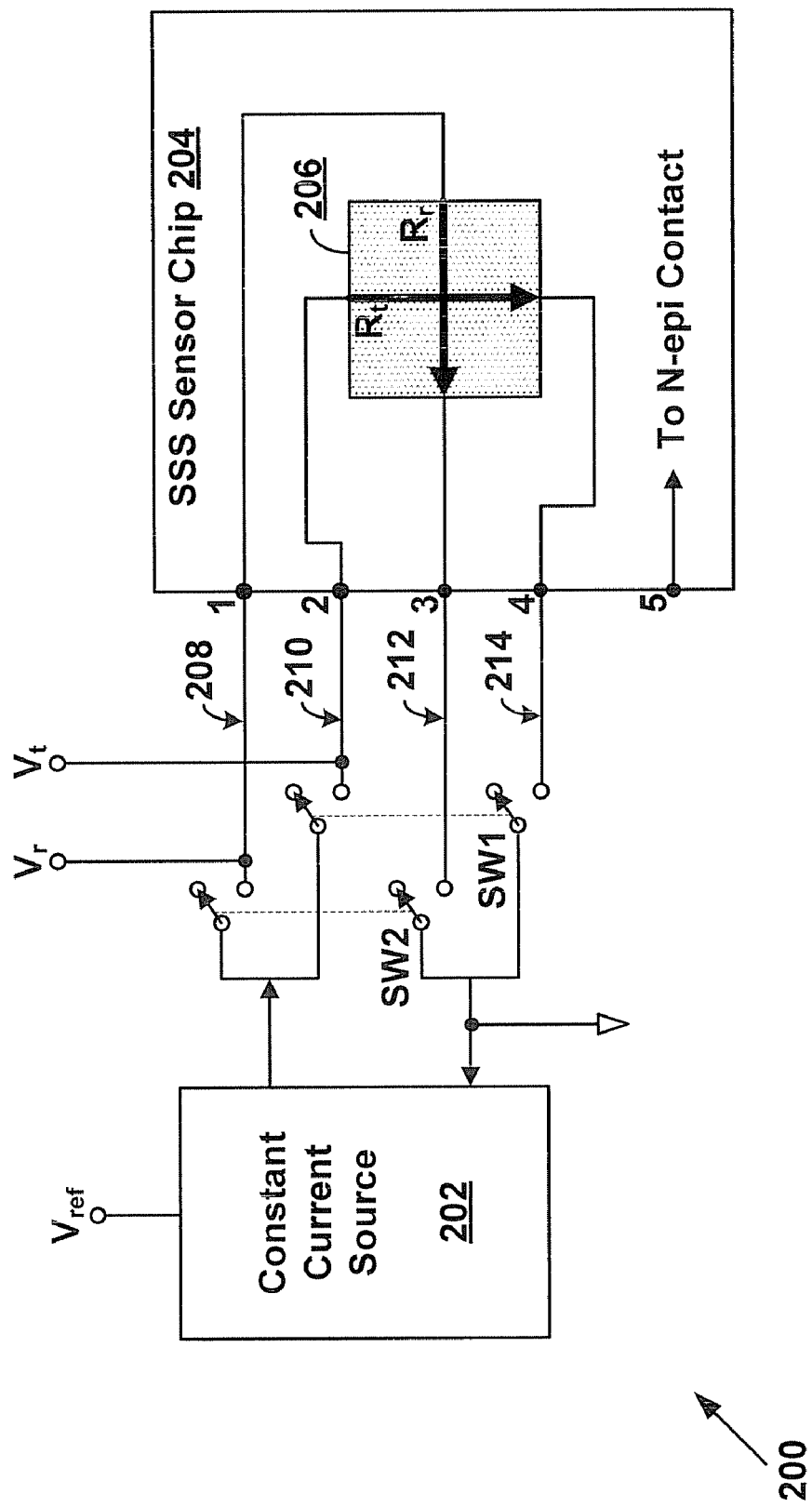
FIG. 2 illustrates one embodiment of a single square sensor (SSS).

Referring now to the figures, and more particularly to FIG. 2, one embodiment of a single square sensor (SSS) 200 is illustrated. It should be understood that the SSS 200 in FIG. 2 and other arrangements described herein are set forth for purposes of example only, and other arrangements and elements can be used instead and some elements may be omitted altogether, depending on manufacturing preferences.

The sensing element 200 includes a constant current source 202 that drives a single square silicon (SSS) sensor chip 204. The constant current source 202 may provide a current of 1 ma, for example. Switches connect the current source 202 to the SSS chip 204. As shown, a first switch, SW1, connects the constant current source 202 to the SSS chip 204 at nodes 2 and 4. A second switch, SW2, connects the constant current source 202 to the SSS chip 204 at nodes 1 and 3. The switches SW1 and SW2 could be integrated on the SSS chip 204 itself.

The SSS chip 204 may be a solid-state device. The SSS chip 204 includes a single square silicon (SSS) element 206, which senses both applied pressures and ambient temperatures. The SSS element 206 has two inputs: one input is a radial voltage input from lead 208 and the other input is a tangential input from lead 210. The SSS element 206 accordingly has two outputs: one output is a radial voltage output ($V_r$) at lead 212, and the other output is a tangential voltage output ($V_t$) at lead 214.

The sensing element 200 may further include switches SW3 and SW4 (not shown) to control power supplied to the SSS sensor chip 204. Additional switches may be controlled by the current source 202 or by an independent controller (not shown). In particular, additional switches may control whether power with positive or negative polarity (as seen by the sensor chip 204) is provided to the sensor chip 204. For more information, the reader is referred to U.S. patent application Ser. No. 11/272,306 to Thomas Stratton, entitled "Method and System of Providing Power to a Pressure and Temperature Sensing Element," the entire contents of which are herein incorporated by reference, as if fully set forth in this description.

The SSS chip 204 may also include a diaphragm (not shown) upon which the SSS element 206 is mounted. When a pressure is applied to the diaphragm, a lattice structure of the SSS chip becomes stressed and alters a mobility of charge carriers in the SSS element 206 temporarily changing a radial (e.g., strain in the direction from a center of the sensor toward the edge) and tangential (e.g., strain perpendicular to the radial strain) resistance of the SSS element 206. By measuring the radial voltage output ($V_r$) and the tangential voltage output ($V_t$), an applied pressure to the SSS chip 204 and an ambient temperature of the SSS chip 204 can be approximated.

Figure 3:
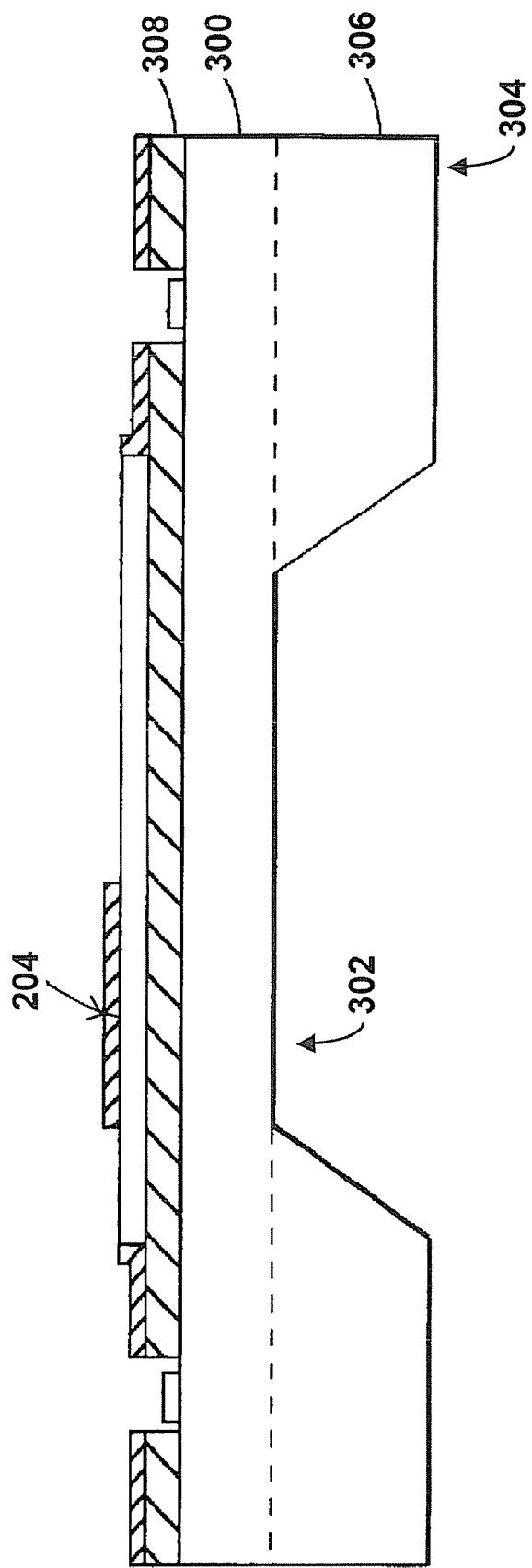
FIG. 3 illustrates a side view of one embodiment of the single square sensor (SSS).

The SSS chip 204 may comprise a silicon-on-insulator structure or a bulk silicon structure, for example. FIG. 3 illustrates a side view of one embodiment of such a structure.

The SSS chip 204 is mounted on a diaphragm 300 that has an inner edge 302 and an outer edge 304. The sensing element further includes legs 306 for connecting the diaphragm 300 to any circuit or other substrate. Also, any number of substrate layers (e.g., layer 308) may be deposited onto the diaphragm 300 onto which the sensor chip 204 may be placed, for example. As shown, the sensor chip 204 is positioned on the inner edge 302 of the diaphragm 300.

Figure 4:
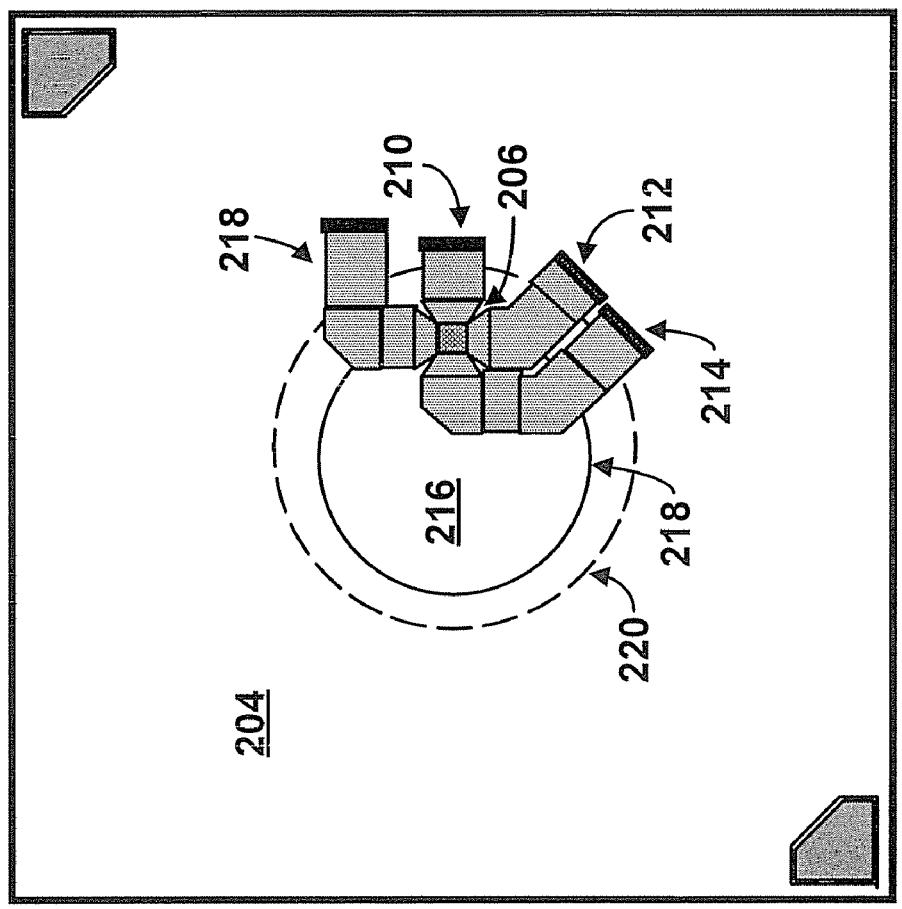
FIG. 4 illustrates one example of a magnified pictoral view of the SSS chip.

FIG. 4 illustrates one example of a magnified pictoral view of the SSS chip 204. The SSS chip 204 is illustrated mounted on a diaphragm 216. The diaphragm 216 includes an inner edge 218 and an outer edge 220. As shown, the SSS chip 204 may be mounted on the inner edge 218 of the diaphragm. A maximum stress of the flexible membrane may occur on the inner edge 218 of the diaphragm 216, and thus, the SSS chip 204 can be positioned to sense the maximum amount of stress, for example. Applied pressures to the diaphragm 216 will deflect a flexible membrane of the diaphragm 216, and these stresses in the membrane will change resistances of the SSS chip 204. Such changes in resistance in the SSS chip 204 will cause a change in output voltages of the SSS chip 204 that are proportional to the applied pressures. For example, an approximate 0.5 mm deflection in the flexible membrane of the diaphragm can be detected in a change in resistances within the SSS chip 204.

A thickness and diameter of the diaphragm 216, e.g., an aspect ratio of diaphragm, can be selected to be give rise to a certain deflection, which is equivalent to a certain change in resistance. For example, a thick diaphragm may result in a small change in resistance on the SSS chip 204 due to an applied pressure, and a thin diaphragm may result in a large change in resistance on the SSS chip 204 from the applied pressure.

Voltage outputs from the sensing element correspond to a certain pressure and temperature reading. The exact correspondence depends on the aspect ratio of the diaphragm 300, and a size of circuit elements relative to a strain localization. Other factors can also affect the correspondence between voltages and pressure/temperature readings.

Furthermore, many different ranges of pressure can be measured using the sensing element. A specific limit depends on the material of the diaphragm 216 and on the aspect ratio (e.g., thickness of diaphragm), for example. A low range PSI full scale sensitivity could be sensed, as well as pressures up to about 20,000 PSI FSS, for example. For one specific example, the sensing element 10 may be used in a medium pressure application, such as measuring 500-3000 PSI and in high temperature applications.

For more information regarding the SSS, the reader is referred to U.S. application Ser. No. 11/271,701 to Russell Johnson entitled "Pressure and Temperature Sensing Element," the entire contents of which are herein incorporated by reference, as is fully set forth in this description.

II. SINGLE SQUARE SENSOR (SSS) OPERATION

Figure 5:
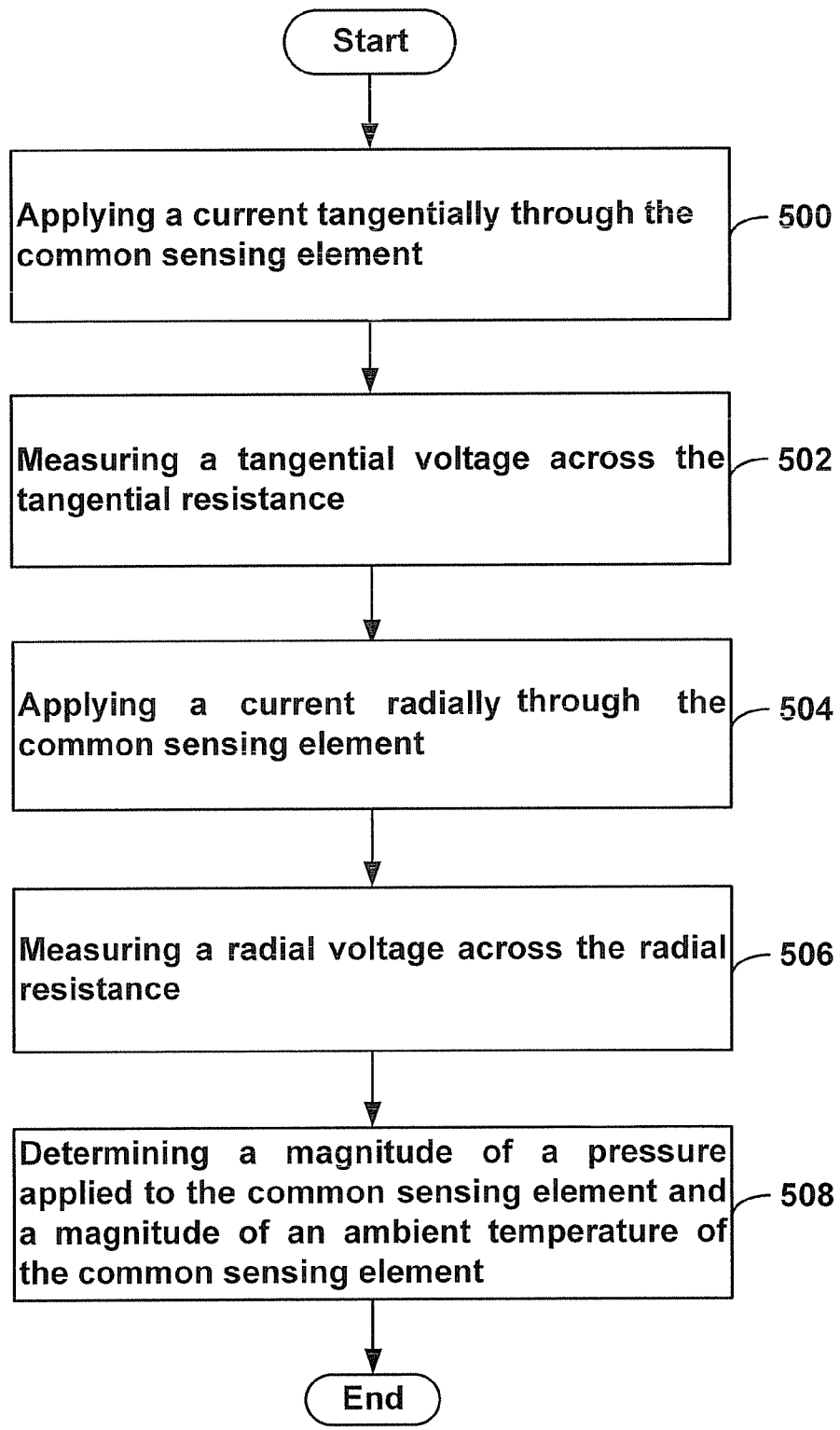
FIG. 5 is a flowchart depicting functional blocks of one example of a method for measuring pressure and temperature using a common sensing element.

FIG. 5 is a flowchart depicting an example of functional blocks of a method for measuring pressure and temperature using a common sensing element. The common sensing element may be the SSS chip 204, for example, as illustrated in FIG. 2. In such an example, the common sensing element has a tangential resistance when current flow is tangential to the common sensing element and a radial resistance when current flow is radial to the common sensing element. As shown at block 500, initially a current is applied tangentially through the common sensing element. A tangential voltage across the tangential resistance can then be measured, as shown at block 502. Next, as shown at block 504, a current is applied radially through the common sensing element. A radial voltage across the radial resistance can then be measured, as shown at block 506. Following, a magnitude of a pressure applied to the common sensing element and a magnitude of an ambient temperature of the common sensing element can be determined using the tangential voltage and the radial voltage, as shown at block 508.

Thus, in one embodiment, a single piezo-resistive element may be operated as both a radial piezo-resistor (Rr) and as a tangential piezo-resistor (Rt), so that when operated with a constant current source, the difference in voltage drop across Rr and Rt is proportional to a measurement of pressure and the sum of a voltage drop across Rr and Rt is proportional to a measurement of temperature.

In particular, referring to FIG. 2, when the SSS chip 204 is driven by the current source 202, outputs of the SSS chip 204 can be associated with a pressure or temperature as applied to the sensing element 200. Two resistances can be measured across the square silicon element 206. A resistance for the condition where current flow is tangential to the square 206 is defined as the tangential resistance $R_t$. This condition applies when SW1 is closed and SW2 is open. Conversely, a resistance for the condition where current flow is radial to the square 206 is defined as the radial resistance $R_r$. This condition applies when SW2 is closed and SW1 is open. Thus, a voltage $V_t$, at node 2 is found as follows:

$$V_t = \left(1 + \frac{dR_t}{R_t}\right) R_t I_{cc} \quad \text{Eq. (1)}$$

where $I_{cc}$ is the current applied from the constant current source and $$\frac{dR_t}{R_t}$$

is the tangential piezoresistive gage factor (e.g., constant value that relates a radial strain or defamation of the surface to the change in resistance and is dependent upon the properties of the materials of the sensor). A voltage $V_r$, at node 1 is similarly found as follows:

$$V_r = \left(1 - \frac{dR_r}{R_r}\right) R_r I_{cc} \quad \text{Eq. (2)}$$

where $$\frac{dR_r}{R_r}$$

is the radial piezoresistive gage factor.

For conditions of $R_t = R_r = R_o$, and $$\left|\frac{dR_t}{R_t}\right| = \left|\frac{dR_r}{R_r}\right| = \left|\frac{dR_o}{R_o}\right|,$$

then the differential voltage dV proportional to pressure is the difference of $V_t$ and $V_r$, as follows:

$$dV = (V_t - V_r) = 2\left(\frac{dR}{R_o}\right)(R_o I_{cc}) = 2\left(\frac{dR}{R_o}\right)(V_{cm}) \quad \text{Eq. (3)}$$

where $(R_o I_{cc}) = V_{cm}$ is the common mode voltage drop across the SSS chip 204 for both the tangential and radial operating modes at pressure=0 conditions. As one example, for $R_o=2.5$ k ohm and $I_{cc}=1$ ma, $V_{cm}=2.5$ volts. Thus, an applied pressure to the SSS chip 204 is proportional to the difference between the tangential and radial voltage measured across the SSS element 206.

Note that if $V_{cm}$ is designed to be half of the $V_{ref}$ voltage of the current source 12, Eq. (3) then becomes:

$$dV = \left(\frac{dR}{R_o}\right) V_{ref} \quad \text{Eq. (4)}$$

Equation (4) is that of a full Wheatstone bridge pressure sensor configuration operating with a constant voltage source of $V_{ref}$. Thus, the sensing element 10 can provide the same pressure voltage output as that of full Wheatstone bridge sensors, but accomplishes such with a single piezo-resistive element rather than four, for example.

In addition, outputs of the SSS chip 204 can also be associated with an ambient temperature of the sensing element 200. A temperature signal designated as VT is defined as the sum of $V_t$ and $V_r$, which are defined in Equations (1) and (2) above. Therefore, VT is defined as follows:

$$VT = (V_t + V_r) = \left(\left(1 + \frac{dR_t}{R_t}\right) R_t I_{cc}\right) + \left(\left(1 - \frac{dR_r}{R_r}\right) R_r I_{cc}\right) \quad \text{Eq. (5)}$$

For $|dR_t| = |dR_r|$, then VT(T) becomes:

$$VT(T) = [R_r(T) + R_t(T)] I_{cc} \quad \text{Eq. (6)}$$

and VT is then independent of pressure. Thus, an ambient temperature of the SSS chip 204 is proportional to the sum of the tangential and radial voltage measured across the SSS element 206.

Thus, using the same common sensing element, e.g., the SSS element 206, to measure both pressure and temperature lessens or eliminates any temperature gradient between the pressure and temperature signal since the same measurements of the same element are used for both. For example, compensations of pressure measurements using the temperature measurements may be more accurate since the pressure and temperature measurements originate from the same sensing element.

In one example, to reduce a power-up-drift phenomena within the sensing element 200, a power polarity switching technique can be applied to the current source 202. For example, the current source 202 provides power in a radial and tangential direction. Further, the current source 202 could be arranged to provide power having a positive and negative polarity. The current source 202 could then apply power to the sensing element 200 in a radial direction having a positive polarity, then in the radial direction having a negative polarity, and same for the tangential direction. For more information, the reader is referred to U.S. patent application Ser. No. 11/272,306 to Thomas Stratton, entitled "Method and System of Providing Power to a Pressure and Temperature Sensing Element," the entire contents of which are herein incorporated by reference, as if fully set forth in this description.

III. VACUUM REFERENCE ON CHIP

Figure 6:
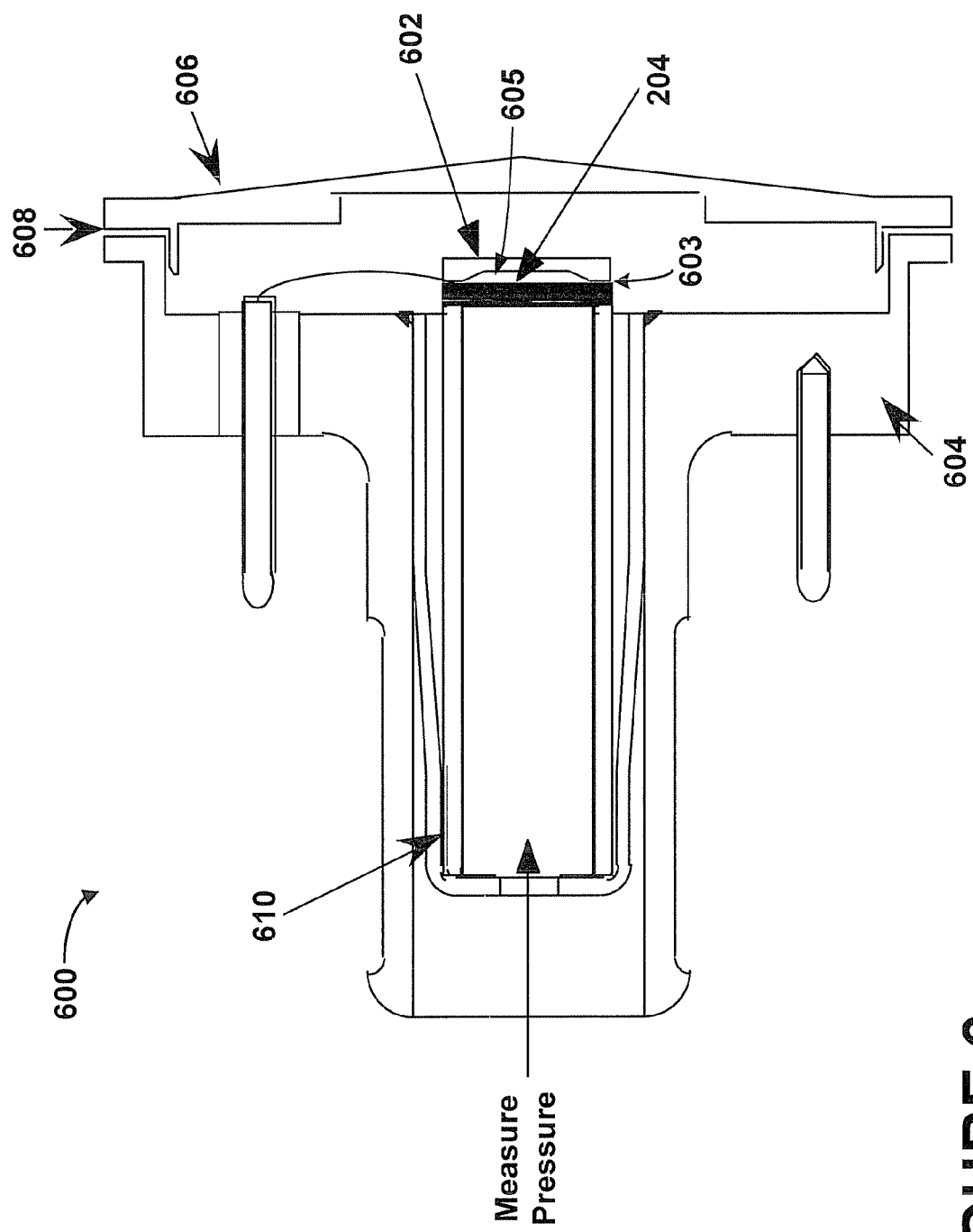
FIG. 6 illustrates one embodiment of a pressure sensor.

The SSS chip 204 may be mounted or positioned within any number of housings depending on the type of pressure to be detected. FIG. 6 illustrates one embodiment of a pressure sensor 600 including the SSS chip 204. The sensor 600 includes a glass wafer 602 hermetically bonded 603 to the SSS chip 204. The SSS chip 204 is positioned between a header 604 and a cover 606, which can be glued together using an epoxy 608, for example. A tube 610, such as a pyrex tube, is connected to the SSS chip 204 through which pressure is sensed, for example.

In existing sensors, a vacuum reference for an absolute pressure sensor is created and maintained using custom hermetic packages and elaborate vacuum sealing techniques. However, using the SSS chip 204 and the configuration illustrated in FIG. 6, after bonding the wafer 602 to the SSS chip 204, a vacuum seal is created and thus less emphasis is placed on hermetically sealing the remainder of the sensor 600. For example, the header 606 and cover 604 can be coupled using epoxy instead of a one-shot weld. Similarly, the tube 610 can be glued within the header 604 with epoxy as well, since the wafer 602 creates the vacuum seal for the SSS chip 204.

Figure 7:
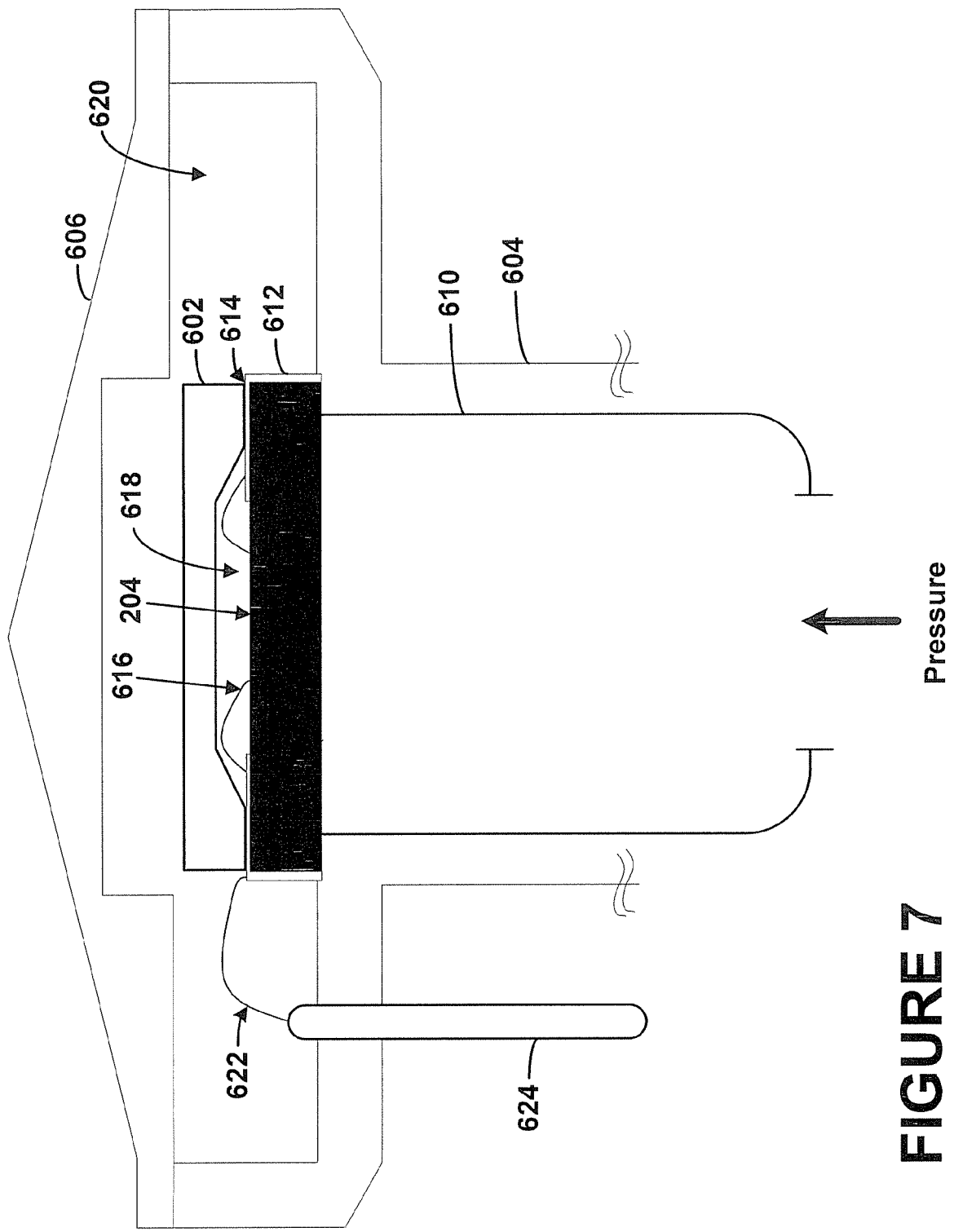
FIG. 7 illustrates another embodiment of the pressure sensor of FIG. 6.

The wafer 602 may be a silicon or glass wafer with an etched cavity or recessed portion 605 that can be aligned over the SSS pressure sensor diaphragm and bonded 603 to the pressure sensor wafer while in a vacuum, using gold, germanium, lead, tin or silver, for example. The recessed portion 605 provides space into which a diaphragm of the SSS chip 204 can deflect. Thus, the wafer bond creates a vacuum reference on the SSS chip 204. The silicon or glass bonding wafer also leaves areas open for to wirebond to the pressure sensor bond pads for electrical contact. For example, FIG. 7 illustrates one example of the pressure sensor 600. Electrical contact 612 is present on the SSS chip 204 to which wirebonds 616 connect and transfer electrical signals from the SSS chip 204 to electrical contact 612, and further through wirebond 622 to leads, such as lead 624. Alternatively, no wirebond 616 may be necessary since electrical signals can be transferred from the SSS chip 204 to the electrical contact 612 through integrated circuitry, for example.

Since the wafer 602 is sealed to the SSS chip 204, an area 618 provides a vacuum seal for the SSS chip 204. Therefore, area 620 does not need to be hermetically sealed. In addition, since the SSS chip 204 comprises only one resistive element, which is used for both temperature and pressure sensing, only 4 to 6 wire bonds, for example, are needed leaving more surface area on the SSS chip 204 to which the wafer 602 can be bonded. Providing a large surface to which the wafer 602 can be bonded enables for batch processing, e.g., such as 400 at a time. Further, the wafer 602 does not need to cover the entire surface area of the SSS chip 204, so more area is left open to wire bond pins to the SSS chip 204.

In addition, the wafer 602 is bonded to the circuit side or electrical surface of the SSS chip 204, as illustrated in FIG. 7, to provide a unique configuration adapted to use of the SSS chip 204. For example, using the SSS chip 204, there will be less bond pads on the die than compared with current pressure sensor dies. As such, the SSS chip design permits anodic bonding between the wafer 602 and the die to create a vacuum reference on the circuit side of the SSS chip 204. This enables use of batch processing and use of less expensive packaging and/or processing for sensor assembly with little impact to sensor performance, for example.

Using the configuration illustrated in FIGS. 6 and 7, any type of pressure sensor can be created with the SSS chip 204, e.g., such as a differential, gage or absolute pressure sensor. In one embodiment, the pressure sensor is an absolute pressure sensor, and the space or volume enclosed by the wafer 602 can be evacuated down to a hard vacuum prior to the hermetic sealing of the wafer 602 to establish a vacuum reference for the absolute pressure sensor. Thus, with a vacuum on one side of the SSS chip 204, and with a positive pressure applied to the other side, the SSS chip 204 will be flexed as a function of the differential in pressure. Such flexing, in turn, will produce an output voltage signal corresponding to a pressure and temperature that is sensed, as explained above.

The hermetic seal between the wafer 602 and the SSS chip 204 provides or permits a vacuum reference for an absolute pressure sensor. In addition, the seal provides environmental protection for the active or circuit side of the SSS chip 204. Further, the hermetic seal provides for pressure sensor stability over a period of time.

The sensor packaging, e.g., header 604 and cover 606, may be stainless steal, ceramic, plastic, aluminum or others depending on the application of the sensor. The entire sensor may be approximately 0.75 inches by 0.75 inches, and as such, the sensor may be used within integrated circuit applications, for example. The sensor can be other sizes as well.

Using the SSS chip 204 and the configuration as illustrated in FIGS. 6 and 7 it may be possible to detect pressures in the range of 0-3000 PSI, or possibly up to 10,000 to 20,000 PSI, limited by the types of materials selected for the header 604 and cover 606.

IV. CONCLUSION

The SSS sensor described within many embodiments herein can be used to reduce a complexity of typical Wheatstone bridge sensors, to increase pressure sensitivity and reduce in on-chip voltage, which reduces average power usage, and to reduce thermal gradients between pressure and temperature measurements, for example.

In addition, using the exemplary pressure sensor housing configurations, a vacuum reference is created on chip, and thus a hermetic packaging is not needed. For example, no welding for hermetic seals is necessary, but rather other glues can be used, such as epoxy.

The present application has been described with reference to silicon as the semiconductor material for the SSS. However, it should be understood that the present application is not limited to silicon, but applies to other semiconductor materials as well. In addition, a pressure and temperature sensor was used as an example to explain the present application; however the present application applies as well to other types of sensors.

While exemplary embodiments have been described, persons of skill in the art will appreciate that variations may be made without departure from the scope and spirit of the invention. This true scope and spirit is defined by the appended claims, which may be interpreted in light of the foregoing.

What is claimed is:

1. A sensor comprising:
a single sensing die having a tangential resistance when current flow is tangential to the sensing die and a radial resistance when current flow is radial to the sensing die, and wherein a tangential voltage across the tangential resistance and a radial voltage across the radial resistance can be measured to determine a magnitude of a pressure applied to the single sensing die; and
a wafer cover having a recessed portion, the wafer cover bonded to a surface of the single sensing die providing a vacuum seal within the recessed portion between the wafer cover and the single sensing die.

2. The sensor of claim 1, wherein the tangential voltage across the tangential resistance and the radial voltage across the radial resistance can also be measured to determine a magnitude of an ambient temperature of the single sensing die.

3. The sensor of claim 1, wherein the wafer cover is bonded to a surface of the single sensing die that includes integrated circuitry.

4. The sensor of claim 1, wherein the wafer cover is hermetically bonded to the single sensing die.

5. The sensor of claim 1, further comprising:
a header; and
a cover coupled to the header,
wherein the single sensing die is positioned between the header and the cover.

6. The sensor of claim 1, wherein the cover is not hermetically sealed to the header.

7. A pressure and temperature sensor comprising:
a header;
a cover coupled to the header;
a sensing die positioned in an area between the header and cover; and
a wafer cover having a recessed portion, the wafer cover being hermetically bonded to the sensing die to provide a vacuum seal as a reference pressure within the recessed portion.

8. The pressure and temperature sensor of claim 7, wherein the header and cover are glued is together using an epoxy.

9. The pressure and temperature sensor of claim 7, wherein the cover is not hermetically sealed to the header.

10. The pressure and temperature sensor of claim 7, wherein the wafer cover is bonded to a side of the sensing die that includes an electrical circuit.

11. The pressure and temperature sensor of claim 7, further comprising a tube connected to the sensing die through which pressure is sensed.

12. The pressure and temperature sensor of claim 7, wherein the wafer cover is bonded to the sensing die such that the recessed portion is between the wafer cover and the sensing die.

13. The pressure and temperature sensor of claim 7, wherein the sensing die has a tangential resistance when current flow is tangential to the sensing die and a radial resistance when current flow is radial to the sensing die, and wherein by changing a direction of current through the sensing die a tangential voltage across the tangential resistance and a radial voltage across the radial resistance can be measured to determine a magnitude of a pressure applied to the sensing die and to determine a magnitude of an ambient temperature of the sensing die.

14. The pressure and temperature sensor of claim 7, further comprising electrical leads coupled to the sensing die to receive electrical signals from the sensing die.

15. A sensor comprising:
a single square sensing die, the single square sensing die having a tangential resistance when current flow is tangential to the sensing die and a radial resistance when current flow is radial to the sensing die, and wherein by changing a direction of current through the single square sensing die a tangential voltage across the tangential resistance and a radial voltage across the radial resistance can be measured to determine a magnitude of a pressure applied to the single square sensing die and to determine a magnitude of an ambient temperature of the single square sensing die;
a sensor cover hermetically bonded to the single square sensing die; and
a header coupled to a cover to form a housing, wherein the single square sensing die is positioned within the housing.

16. The sensor of claim 15, further comprising a tube coupled to the housing through which pressure and temperature are sensed.

17. The sensor of claim 15, wherein the sensor cover includes an etched cavity, and the sensor cover is bonded to the single square sensing die such that the etched cavity is aligned over a diaphragm of the single square sensing die.

18. The sensor of claim 15, wherein the housing is not hermetically sealed.

19. The sensor of claim 15, wherein the sensor is an absolute pressure sensor.

20. The sensor of claim 15, further comprising electrical leads coupled to the single square sensing die to receive electrical signals from the single square sensing die.

* * * * *